US012626940B2

(12) United States Patent
Akabori et al.

(10) Patent No.: US 12,626,940 B2
(45) Date of Patent: May 12, 2026

(54) FUEL CELL SYSTEM

(71) Applicant: HONDA MOTOR CO., LTD., Tokyo (JP)

(72) Inventors: Sho Akabori, Wako (JP); Shuto Maniwa, Wako (JP); Tomoyuki Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 480 days.

(21) Appl. No.: 18/127,139

(22) Filed: Mar. 28, 2023

(65) Prior Publication Data

US 2023/0327153 A1     Oct. 12, 2023

(30) Foreign Application Priority Data

Mar. 30, 2022     (JP) ................................. 2022-055973

(51) Int. Cl.
　　*H01M 8/04746* 　　(2016.01)
　　*H01M 8/04082* 　　(2016.01)
　　*H01M 8/04302* 　　(2016.01)

(52) U.S. Cl.
　　CPC ... *H01M 8/04302* (2016.02); *H01M 8/04753* (2013.01); *H01M 2250/20* (2013.01)

(58) Field of Classification Search
　　CPC ......... H01M 8/04302; H01M 8/04753; H01M 2250/20; H01M 8/04955; H01M 8/04089; H01M 8/04201; H01M 8/04298; Y02E 60/50
　　USPC ....................................................... 429/429
　　See application file for complete search history.

(56) References Cited

U.S. PATENT DOCUMENTS

| | | | |
|---|---|---|---|
| 2016/0141684 A1 | 5/2016 | Yamanaka et al. | |
| 2018/0342747 A1 | 11/2018 | Kim | |
| 2019/0372140 A1 | 12/2019 | Hayase | |
| 2020/0099069 A1 | 3/2020 | Yoshioka et al. | |
| 2020/0185739 A1* | 6/2020 | Ito ..................... | H01M 8/04179 |
| 2020/0243879 A1* | 7/2020 | Tanaka .............. | H01M 8/04828 |
| 2020/0403256 A1* | 12/2020 | Itou ................... | H01M 8/04582 |
| 2021/0075043 A1* | 3/2021 | Hatazaki .......... | H01M 8/04761 |

(Continued)

FOREIGN PATENT DOCUMENTS

| | | |
|---|---|---|
| CN | 108933268 A | 12/2018 |
| CN | 112599819 A | 4/2021 |
| JP | 2009-152131 A | 7/2009 |

(Continued)

OTHER PUBLICATIONS

Office Action dated Oct. 31, 2023 issued in the corresponding Japanese Patent Application No. 2022-055973 with the English machine translation thereof.

(Continued)

*Primary Examiner* — Christian Roldan
(74) *Attorney, Agent, or Firm* — Carrier, Shende & Associates P.C.; Joseph P. Carrier; Jeffrey T. Gedeon

(57) ABSTRACT

A fuel cell system includes a first battery, a second battery having a second battery voltage larger than the first battery voltage, and a step-down device for stepping down a voltage of the second battery. When the voltage supplied from the first battery to the control device is equal to or lower than the voltage threshold value, the control device supplies electric power to the bypass valve from the step-down device to perform opening degree learning for the bypass valve.

3 Claims, 2 Drawing Sheets

(56)                  References Cited

U.S. PATENT DOCUMENTS

2021/0104758  A1 *    4/2021   Tanimoto .......... H01M 8/04567

FOREIGN PATENT DOCUMENTS

| | | | |
|---|---|---|---|
| JP | 2011-217445 | A | 10/2011 |
| JP | 2016-096088 | A | 5/2016 |
| JP | 2018-200760 | A | 12/2018 |
| JP | 2019-212475 | A | 12/2019 |
| WO | 2009/060679 | A1 | 5/2009 |

OTHER PUBLICATIONS

Office Action including Search Report dated Mar. 18, 2026 issued
in the corresponding Chinese Patent Application No. 202310310679.3
with the English machine translation thereof.

* cited by examiner

FIG. 2

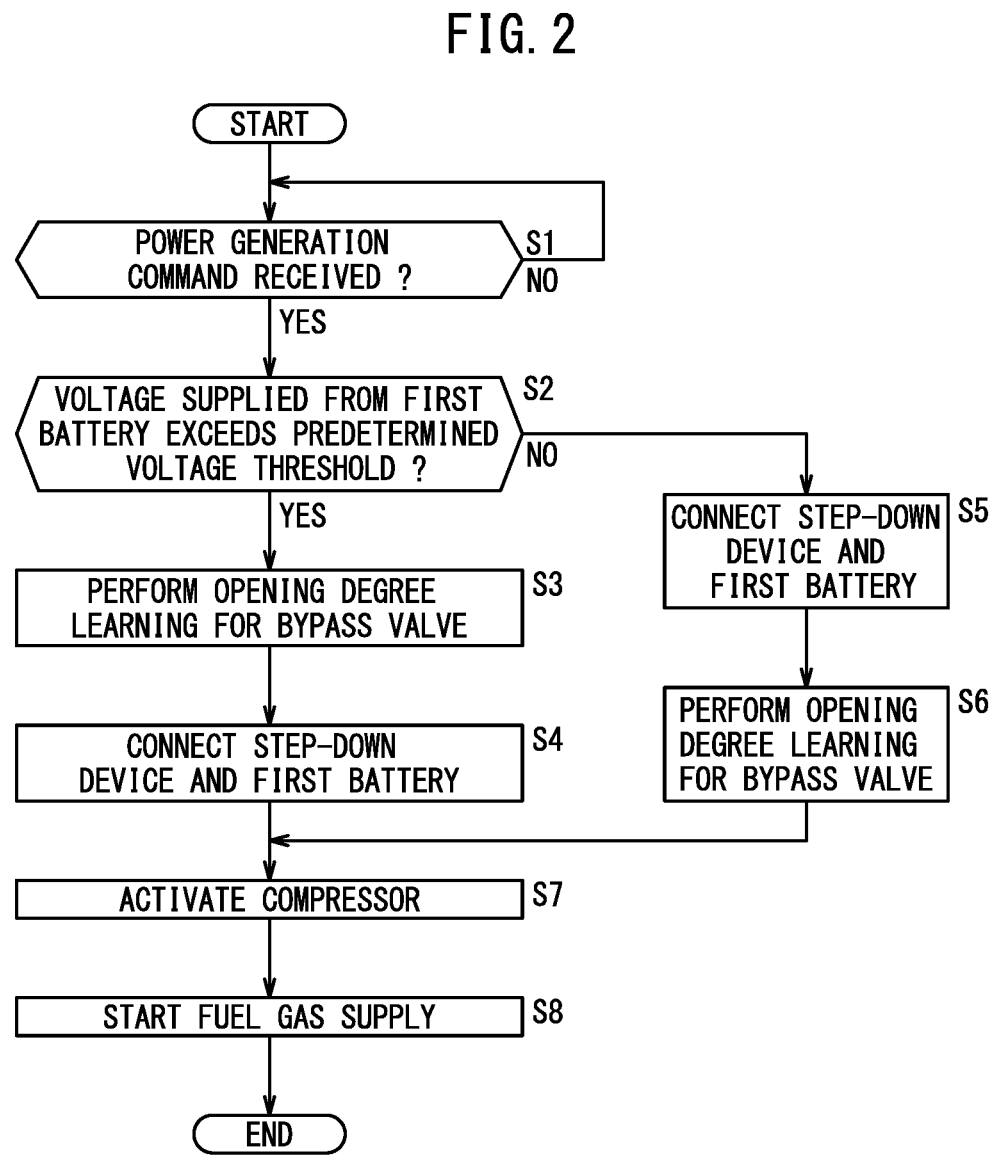

```
                         ( START )
                             │
                             ▼  ◄──────────────────────┐
              ┌──────────────────────────┐             │
              <  POWER GENERATION          > S1         │
              <  COMMAND RECEIVED ?        > NO ─────────┘
              └──────────────────────────┘
                             │ YES
                             ▼
         ┌────────────────────────────────┐
         <  VOLTAGE SUPPLIED FROM FIRST     > S2
         <  BATTERY EXCEEDS PREDETERMINED   >
         <  VOLTAGE THRESHOLD ?             > NO ──────────────┐
         └────────────────────────────────┘                   │
                             │ YES                             ▼
                             ▼                      ┌──────────────────────┐
         ┌────────────────────────────┐            │ CONNECT STEP-DOWN   S5│
         │ PERFORM OPENING DEGREE   S3 │            │ DEVICE AND           │
         │ LEARNING FOR BYPASS VALVE   │            │ FIRST BATTERY        │
         └────────────────────────────┘            └──────────────────────┘
                             │                                 │
                             ▼                                 ▼
         ┌────────────────────────────┐            ┌──────────────────────┐
         │ CONNECT STEP-DOWN        S4 │            │ PERFORM OPENING    S6│
         │ DEVICE AND FIRST BATTERY    │            │ DEGREE LEARNING      │
         └────────────────────────────┘            │ FOR BYPASS VALVE     │
                             │                      └──────────────────────┘
                             ▼  ◄───────────────────────────────┘
         ┌────────────────────────────┐
         │ ACTIVATE COMPRESSOR      S7 │
         └────────────────────────────┘
                             │
                             ▼
         ┌────────────────────────────┐
         │ START FUEL GAS SUPPLY    S8 │
         └────────────────────────────┘
                             │
                             ▼
                         ( END )
```

FUEL CELL SYSTEM

CROSS-REFERENCE TO RELATED APPLICATIONS

This application is based upon and claims the benefit of priority from Japanese Patent Application No. 2022-055973 filed on Mar. 30, 2022, the contents of which are incorporated herein by reference.

BACKGROUND OF THE INVENTION

Field of the Invention

The present invention relates to a fuel cell system to be mounted on a moving object or the like.

Description of the Related Art

In recent years, fuel cell stacks have attracted attention in various fields. For example, there is a fuel cell vehicle equipped with a fuel cell stack. A fuel cell vehicle is powered by an electric motor running on electricity generated by electrochemical reactions in the fuel cells. In a fuel cell vehicle, only water is discharged. Therefore, the fuel cell vehicle is more environmentally friendly in comparison with gasoline-powered vehicles or the like that emit $CO_2$, NOx, SOx, and the like. The fuel cell stack may be mounted on other moving objects such as ships, aircrafts, robots and so on, in addition to automobiles.

JP 2009-152131 A discloses a fuel cell system which operates a fuel cell stack. The fuel cell system disclosed in JP 2009-152131 A includes an oxygen-containing gas flow path through which an oxygen-containing gas to be supplied to the fuel cell stack flows, an oxygen-containing off-gas flow path through which an oxygen-containing off-gas discharged from the fuel cell stack flows, and a bypass channel for guiding a part of the oxygen-containing gas flowing through the oxygen-containing gas flow path to a discharge passage while bypassing the fuel cell stack. For a bypass valve provided in the bypass passage, opening degree learning (origin learning) is performed at a timing for returning the opening degree of the bypass valve to 0 during warm-up operation immediately after system activation.

SUMMARY OF THE INVENTION

However, in the fuel cell system disclosed in JP 2009-152131 A, if there is an instruction to open the bypass valve while the opening degree learning (origin learning) is being performed, the opening degree learning is forcibly terminated. Therefore, there is a concern that the origin learning is not completed. That is, it has been a problem to complete the opening degree learning without prolonging the time until the power generation by the fuel cell stack is started.

An object of the present invention is to solve the above-described problem.

To achieve the above-mentioned object, an aspect of the present invention is to provide a fuel cell system including: a bypass channel connected to an oxygen-containing gas supply flow path through which an oxygen-containing gas to be supplied to a fuel cell stack flows and an oxygen-containing gas discharge flow path through which the oxygen-containing gas discharged from the fuel cell stack flows; a bypass valve disposed in the bypass channel; a first battery having a first battery voltage; a second battery having a second battery voltage higher than the first battery voltage;

a step-down device configured to step down a voltage supplied from the second battery; a switching unit configured to switch between the first battery and the step-down device to supply power to the bypass valve; and a control device including one or more processors that execute computer-executable instructions stored in a memory, wherein the one or more processors execute the computer-executable instructions to cause the control device to: control the switching unit to supply electric power to the bypass valve from the step-down device and control an opening degree of the bypass valve, in a case where the voltage supplied from the first battery to the control device is equal to or lower than the predetermined voltage threshold.

According to the aspect of the present invention, it is possible to complete the opening degree learning for the bypass valve even when degradation of the first battery progresses. As a result, the opening degree learning can be completed without prolonging the time until the power generation by the fuel cell stack is started.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a flowchart showing a procedure of an activation control processing of the fuel cell system by the control device.

DETAILED DESCRIPTION OF THE INVENTION

Figure 1:
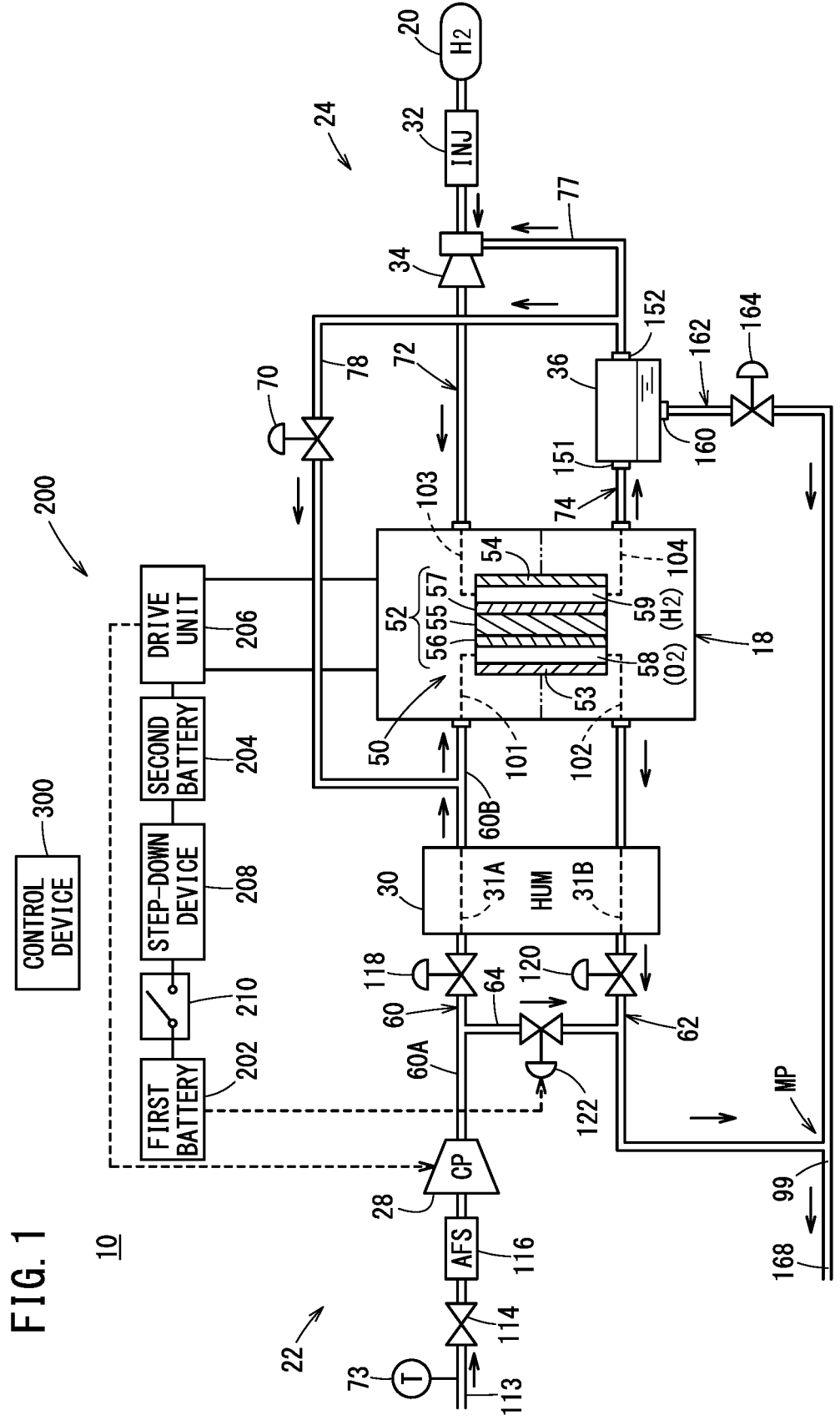
FIG. 1 is a schematic diagram showing a configuration of a fuel cell system according to an embodiment.

FIG. 1 is a schematic diagram showing a configuration of a fuel cell system 10 according to an embodiment. The fuel cell system 10 may be mounted on a moving object such as a vehicle, a ship, an aircraft, a robot or the like. In the present embodiment, the fuel cell system 10 is mounted on a vehicle.

The fuel cell system 10 includes a fuel cell stack 18, a hydrogen tank 20, an oxygen-containing gas supply device 22, and a fuel gas supply device 24.

A fuel cell stack 18 generates electric power through electrochemical reactions between a fuel gas and an oxygen-containing gas. Examples of the fuel gas include hydrogen gas. Examples of the oxygen-containing gas include air containing oxygen gas.

In the fuel cell stack 18, a plurality of power generation cells 50 are stacked. Each of the power generation cells 50 includes a membrane electrode assembly 52, and a pair of separators 53, 54 that sandwich the membrane electrode assembly 52.

Each of the membrane electrode assemblies 52, for example, is equipped with a solid polymer electrolyte membrane 55 in which a thin film of perfluorosulfonic acid is impregnated with water, and a cathode 56 and an anode 57 sandwich the solid polymer electrolyte membrane 55.

Each of the cathode 56 and the anode 57 has a gas diffusion layer (not shown) made from carbon paper or the like. An electrode catalyst layer (not shown) of a platinum alloy supported on porous carbon particles is coated uniformly on the surface of the gas diffusion layer. The electrode catalyst layer is formed on both surfaces of the solid polymer electrolyte membrane 55, respectively.

On a surface of the one separator 53 that faces the membrane electrode assembly 52, a cathode side flow field (an oxygen-containing gas flow field) 58 in communication with an oxygen-containing gas supply passage 101 and an oxygen-containing gas discharge passage 102 is formed.

On a surface of the other separator 54 that faces the membrane electrode assembly 52, an anode side flow field (a fuel gas flow field) 59 in communication with a fuel gas supply passage 103 and a fuel gas discharge passage 104 is formed.

In the anode 57, by the fuel gas (hydrogen) being supplied, hydrogen ions are generated from hydrogen molecules by electrode reactions caused by catalyst, and the hydrogen ions permeate the solid polymer electrolyte membrane 55 and then move to the cathode 56, while electrons are released from hydrogen molecules. The electrons released from hydrogen molecules move to the cathode 56 through the positive terminal.

At the cathode 56, by action of the catalyst, the hydrogen ions and the electrons, and oxygen contained in the supplied oxygen-containing gas are reacted to produce water.

The oxygen-containing gas supply device 22 supplies the oxygen-containing gas to the fuel cell stack 18. The oxygen-containing gas supply device 22 includes a compressor (CP) 28 and a humidifier (HUM) 30.

The compressor 28 is constituted by a mechanical supercharger or the like, and has functions such as sucking outside air (atmosphere, air) from an outside air intake hole 113, pressurizing it, and supplying it to the fuel cell stack 18 through the humidifier 30.

The humidifier 30 has a flow path 31A and a flow path 31B. Air (oxygen-containing gas) compressed, heated to a high temperature and dried by the compressor 28 flows through the flow path 31A. The exhaust gas discharged from the oxygen-containing gas discharge passage 102 of the fuel cell stack 18 flows through the flow path 31B.

Here, while the bleed valve 70 is closed, the exhaust gas is a wet oxygen-containing off-gas (wet cathode off-gas, wet oxygen-containing exhaust gas), whereas while the bleed valve 70 is opened, the exhaust gas is a wet exhaust gas (off-gas) as a mixture of the wet oxygen-containing off-gas and a fuel off-gas (anode off-gas, fuel exhaust gas).

The humidifier 30 has a function of humidifying the oxygen-containing gas supplied from the compressor 28. That is, the humidifier 30 transfers moisture contained in the exhaust gas (off-gas) flowing through the flow path 31B to a supply gas (oxygen-containing gas) flowing through the flow path 31A via an internally provided porous membrane to supply a humidified oxygen-containing gas to the fuel cell stack 18.

A shut-off valve 114, an air flow sensor (AFS: flow rate sensor) 116, the compressor 28, a supply-side stop valve 118, and the humidifier 30 are provided on the oxygen-containing gas supply flow path 60 (including oxygen-containing gas supply flow paths 60A, 60B) extending from the outside air intake hole 113 to the oxygen-containing gas supply passage 101 in this order from the outside air intake hole 113. The flow paths such as the oxygen-containing gas supply flow path 60 drawn by double lines are formed by pipes (the same applies to the following description).

The shut-off valve 114 is opened to allow and close to shut off intake of the air into the oxygen-containing gas supply flow path 60.

The air flow sensor 116 measures the flow rate of the oxygen-containing gas supplied to the fuel cell stack 18 through the compressor 28.

The supply-side stop valve 118 opens and closes the oxygen-containing gas supply flow path 60A.

The outside air intake hole 113 is provided with a temperature sensor 73 that detects (measures) an outside air temperature T.

The humidifier 30 and a discharge-side stop valve 120 that also functions as a back pressure valve are disposed on the oxygen-containing gas discharge flow path 62 in communication with the oxygen-containing gas discharge passage 102 in this order from the oxygen-containing gas discharge passage 102.

A bypass channel 64 is provided between a suction inlet of the supply-side stop valve 118 and a discharge outlet of the discharge-side stop valve 120 to allow the oxygen-containing gas supply flow path 60 and the oxygen-containing gas discharge flow path 62 to communicate with each other. The bypass channel 64 is connected to the oxygen-containing gas supply flow path 60 and the oxygen-containing gas discharge flow path 62 to bypass the fuel cell stack 18. The bypass channel 64 is provided with a bypass valve 122 that opens and closes the bypass channel 64. The bypass valve 122 adjusts the flow rate of the oxygen-containing gas bypassing the fuel cell stack 18. The bypass valve 122 may be a butterfly valve.

The hydrogen tank 20 is a container including a solenoid shut-off valve, and compresses highly pure hydrogen under high pressure, and stores the compressed hydrogen. The fuel gas supply device 24 supplies the fuel gas supplied from the hydrogen tank 20 to the fuel cell stack 18. The fuel gas supply device 24 includes an injector (INJ) 32, an ejector 34, and a gas-liquid separator 36. The injector 32 may be replaced with a pressure reducing valve.

The fuel gas discharged from the hydrogen tank 20 flows through the injector 32 and the ejector 34 that are disposed on a fuel supply flow path 72, and is then supplied to an inlet of the anode flow field 59 of the fuel cell stack 18 through the fuel gas supply passage 103.

An outlet of the anode flow field 59 is connected to a gas supply hole 151 of the gas-liquid separator 36 through the fuel gas discharge passage 104 and a fuel exhaust flow path 74, and a fuel off gas as a hydrogen-containing gas is supplied to the gas-liquid separator 36 from the anode flow field 59.

The gas-liquid separator 36 separates the fuel off gas into gaseous components and liquid components (liquid water). The gaseous components of the fuel off-gas (fuel exhaust gas) are discharged from the gas discharge hole 152 of the gas-liquid separator 36 and supplied to the suction inlet of the ejector 34 through the circulating flow path 77. On the other hand, while the bleed valve 70 is opened, the fuel off-gas is also supplied to the oxygen-containing gas supply flow path 60B through the connecting flow path (communication flow path) 78 and the bleed valve 70.

The liquid components of the fuel exhaust gas are supplied from the liquid discharge hole 160 of the gas-liquid separator 36 through a drain channel 162 to the merge point MP with the oxygen-containing gas discharge flow path 62. An exhaust passage 99 is connected to the merge point MP. The oxygen-containing exhaust gas supplied from the oxygen-containing gas discharge flow path 62 and the fuel exhaust gas supplied from the drain channel 162 are discharged from the exhaust passage 99 to the outside through an exhaust gas opening 168.

In practice, a part of the fuel off-gas (hydrogen-containing gas) is discharged to the drain channel 162 together with the liquid components. In order to dilute the hydrogen gas in the fuel off-gas before discharging it to the outside, a part of the oxygen-containing gas discharged from the compressor 28 is supplied to the merge point MP through the bypass channel 64.

The bleed valve 70 provided in the connecting flow path 78 connecting the fuel off-gas circulation flow path 77 and the oxygen-containing gas supply flow path 60B is controlled to be opened in accordance with either of the following two control processes.

The first control process is that the bleed valve 70 is opened to prevent deterioration of the anode 57 caused by a decrease in the hydrogen concentration in the anode flow field 59 due to permeation of the nitrogen gas present in the cathode flow field 58 through the membrane electrode assembly 52 during movement of the moving object on which the fuel cell system 10 is mounted (first valve continuous opening control process of the bleed valve 70 during moving).

The second is that the bleed valve 70 is opened to reduce the hydrogen concentration in the exhaust gas discharged from the exhaust gas opening 168 to the outside while the operation state of the fuel cell stack 18 is idling, (second valve continuous opening control process of the bleed valve 70 in the idle state).

When the bleed valve 70 is opened, the fuel off-gas discharged from the fuel cell stack 18 through the fuel exhaust flow path 74 via the gas-liquid separator 36 flows to the cathode flow field 58 through the connecting flow path 78, the oxygen-containing gas supply flow path 60B, and the oxygen-containing gas supply passage 101.

The fuel gas in the fuel off-gas flowing through the cathode flow field 58 is ionized into hydrogen ions by catalytic reactions at the cathode 56, and the hydrogen ions react with the oxygen-containing gas to produce water. The remaining unreacted fuel off-gas (composed of nitrogen gas and a small amount of unreacted hydrogen gas) is discharged from the fuel cell stack 18 as the oxygen-containing off-gas, and flows through the oxygen-containing gas discharge flow path 62.

The oxygen-containing off-gas (including the unreacted remaining fuel off-gas) flowing through the oxygen-containing gas discharge flow path 62 is mixed with the oxygen-containing gas supplied through the bypass channel 64 to dilute the fuel off-gas (including the fuel gas) in the oxygen-containing off-gas to a lower concentration, and the resulting oxygen-containing off-gas flows through the merge point MP.

In the exhaust passage 99 connected to the merge point MP, the fuel gas in the mixed fluid of the liquid water and the fuel off-gas discharged from the drain channel 162 is diluted by the oxygen-containing off-gas from the oxygen-containing gas discharge flow path 62, and is discharged to the outside (atmosphere) through the exhaust gas opening 168.

The opening diameter of the bleed valve 70 is larger than that of a drain valve 164 provided in the drain channel 162. Due to the relationship between the opening diameters, even if the drain valve 164 is stuck in an open state by failure due to freezing or the like, the amount of the fuel off-gas flowing into the connecting flow path 78 becomes larger than the amount of the fuel off-gas flowing into the drain valve 164. As a result, the concentration of the fuel gas discharged from the exhaust gas opening 168 can be reduced.

The fuel cell system 10 of the present embodiment further includes an output unit 200 and a control device 300.

The output unit 200 includes a first battery 202, a second battery 204, a drive unit 206, a step-down device 208, and a switch 210.

The first battery 202 is a low-voltage battery that can store a smaller amount of electric power than that to be stored in the second battery 204. The first battery 202 has a first battery voltage. The first battery voltage is the nominal voltage of the first battery 202 and is lower than the nominal voltage of the second battery 204.

The second battery 204 is a high-voltage battery that can store a greater amount of electric power than that to be stored in the first battery 202. The second battery 204 has a second battery voltage. The second battery voltage is the nominal voltage of the second battery 204 and is higher than the nominal voltage of the first battery 202.

The drive unit 206 boosts the output voltage of the fuel cell stack 18 and supplies the boosted voltage to a load. The load includes the compressor 28, a motor for moving the vehicle, and the like. In addition, the drive unit 206 causes the second battery 204 to store electricity generated by the fuel cell stack 18 and electricity obtained by regeneration of the motor for moving the vehicle.

The step-down device 208 steps down a voltage from the second battery 204. The step-down device 208 may be constituted by a DC-DC converter or the like.

The electric power supply is switched by the switch 210 between the route from the first battery 202 to the bypass valve 122 and the route from the step-down device 208 to the bypass valve 122. This switching control is executed by the control device 300. The switch 210 allows electric power from the step-down device 208 to be supplied to the bypass valve 122 via the first battery 202 by electrically connecting the bypass valve 122 and the step-down device 208. On the other hand, the switch 210 allows electric power from the first battery 202 to be supplied to the bypass valve 122 by disconnecting the electrical connection between the bypass valve 122 and the step-down device 208. The switch 210 may be an electromagnetic switch.

The control device 300 includes one or more processors and a storage medium, and executes various kinds of processing based on computations by the one or more processors. The storage medium includes a volatile memory such as a RAM (random access memory) and a nonvolatile memory such as a ROM (read-only memory), a flash memory, and a hard disk. At least a part of the storage medium may be provided in the one or more processors.

The control device 300 controls the entire fuel cell system 10 including the compressor 28, the bypass valve 122, and the switch 210. The control device 300 is activated based on the electricity stored in the first battery 202. For example, when the ignition is turned on, the electric power is supplied from the first battery 202 to the control device 300. When activated, the control device 300 executes an activation control processing for starting operation of the fuel cell system 10.

The activation control processing includes opening degree learning for the bypass valve 122. The opening degree learning is executed by the control device 300. In this case, the control device 300 detects a difference between a designated opening degree designated for the bypass valve 122 and an opening degree indicated by an opening degree signal output from the bypass valve 122. The designated opening degree includes 0% in a case where the bypass valve 122 is closed and 100% in a case where the bypass valve 122 is fully opened. The opening degree signal is acquired from a sensor such as an angle sensor provided to the bypass valve 122. When the difference between the designated opening degree and the opening degree indicated by the opening degree signal exceeds a predetermined threshold, the control device 300 may reset the sensor provided to the bypass valve 122.

FIG. 2 is a flowchart showing a procedure of the activation control processing of the fuel cell system 10 executed by the control device 300. The activation control processing is started in response to the activation of the control device 300.

In step S1, the control device 300 stands ready to receive a power generation command. The power generation command is given from, for example, a higher-level control device or the like that controls the vehicle. When the power generation command is received, the activation control processing proceeds to step S2.

In step S2, the control device 300 compares the voltage supplied from the first battery 202 to the control device 300 with the predetermined voltage threshold. In the case where the voltage from the first battery 202 exceeds the voltage threshold, the control device 300 determines that the first battery 202 is less degraded and that the bypass valve 122 can be driven by the electricity stored in the first battery 202. In this case, the activation control processing transitions to step S3. In step S3, the control device 300 performs the opening degree learning for the bypass valve 122. When the opening degree learning is completed, the activation control processing transitions to step S4. In step S4, the control device 300 controls the switch 210 to connect the step-down device 208 to the first battery 202, and supplies electric power from the step-down device 208 to the bypass valve 122 via the first battery 202. When the step-down device 208 and the first battery 202 are connected, the activation control processing transitions to step S7.

In this way, in the case where the voltage supplied from the first battery 202 to the control device 300 exceeds the voltage threshold, the control device 300 performs the opening degree learning for the bypass valve 122 before connecting the step-down device 208 to the first battery 202. That is, the control device 300 supplies electric power from the first battery 202 to the bypass valve 122 and performs the opening degree learning for the bypass valve 122.

On the other hand, in the case where the voltage supplied from the first battery 202 to the control device 300 is equal to or lower than the voltage threshold, the control device 300 determines that the first battery 202 is considerably degraded and the bypass valve 122 cannot be driven by the electricity stored in the first battery 202. In this case, the activation control processing transitions to step S5. In step S5, the control device 300 controls the switch 210 to connect the step-down device 208 to the first battery 202, and supplies electric power from the step-down device 208 to the bypass valve 122 via the first battery 202. When the step-down device 208 and the first battery 202 are connected, the activation control processing transitions to step S6. In step S6, the control device 300 performs the opening degree learning for the bypass valve 122. When the opening degree learning is completed, the activation control processing transitions to step S7.

In this way, in the case where the voltage supplied from the first battery 202 to the control device 300 is equal to or lower than the voltage threshold, the control device 300 performs the opening degree learning for the bypass valve 122 after connecting the step-down device 208 and the first battery 202. That is, the control device 300 supplies electric power from the step-down device 208 to the bypass valve 122 and performs the opening degree learning for the bypass valve 122.

In step S7, the control device 300 controls the drive unit 206 to start the electric power supply from the second battery 204 or the fuel cell stack 18 to the compressor 28 to activate the compressor 28. When the electric power supply to the compressor 28 is started, the activation control processing transitions to step S8.

In step S8, the control device 300 starts supplying the fuel gas to the fuel cell stack 18. In this case, the control device 300 opens the shut-off valve of the hydrogen tank 20 and starts controlling the injector 32. When the supply of the fuel gas is started, the activation control processing is ended.

The present invention is not particularly limited to the above-described embodiments, and various modifications can be made thereto within a range that does not deviate from the essence and gist of the present invention.

Next, the invention and effects understood from the above embodiments will be described below. It should be noted that, for ease of understanding, constituent elements are labelled with the reference numerals of those used in the embodiments, but the present invention is not limited to such constituent elements labelled with the reference numerals.

(1) The fuel cell system (10) according to an aspect of the present invention including: the bypass channel (64) connected to the oxygen-containing gas supply flow path (60) through which the oxygen-containing gas to be supplied to the fuel cell stack (18) flows and the oxygen-containing gas discharge flow path (62) through which the oxygen-containing gas discharged from the fuel cell stack flows; the bypass valve (122) disposed in the bypass channel; the first battery (202) having the first battery voltage; the second battery (204) having the second battery voltage higher than the first battery voltage; the step-down device (208) configured to step down the voltage from the second battery; the switching unit (210) configured to switch between the first battery and the step-down device to supply power to the bypass valve; and the control device (300) configured to control the switching unit and the bypass valve, wherein the control device performs opening degree learning for the bypass valve, and in the case where the voltage supplied from the first battery to the control device is equal to or lower than the predetermined voltage threshold, the control device supplies power to the bypass valve from the step-down device to perform the opening degree learning for the bypass valve.

As a result, the opening degree learning for the bypass valve can be completed even when degradation of the first battery has progressed. As a result, the opening degree learning can be completed without prolonging the time until the power generation by the fuel cell stack is started.

(2) In the aspect of the present invention, the fuel cell system may further include the compressor (28) configured to supply the oxygen-containing gas to the fuel cell stack, and the control device may start electric power supply to the compressor after completion of the opening degree learning. Thus, it is possible to prevent the oxygen-containing gas output from the compressor from being supplied to the bypass valve during the opening degree learning for the bypass valve. As a result, the opening degree learning for the bypass valve can be performed properly.

The invention claimed is:
1. A fuel cell system comprising:
a bypass channel connected to an oxygen-containing gas supply flow path through which an oxygen-containing gas to be supplied to a fuel cell stack flows and an oxygen-containing gas discharge flow path through which the oxygen-containing gas discharged from the fuel cell stack flows;
a bypass valve disposed in the bypass channel;
a first battery having a first battery voltage;

a second battery having a second battery voltage higher than the first battery voltage;

a step-down device configured to step down a voltage from the second battery;

a switching unit configured to switch between the first battery and the step-down device to supply power to the bypass valve; and a control device including one or more processors that execute computer-executable instructions stored in a memory, wherein the one or more processors execute the computer-executable instructions to cause the control device to:

control the switching unit to supply electric power to the bypass valve from the step-down device and detect a difference between a designated opening degree for the bypass valve and an output opening degree indicated by an opening degree signal output from the bypass valve by controlling an opening degree of the bypass valve, in a case where the voltage supplied from the first battery to the control device is equal to or lower than the predetermined voltage threshold.

2. The fuel cell system according to claim 1, wherein the one or more processors cause the control device to:

control the switching unit in a case where the voltage at a time when the control device is activated by electric power supplied from the first battery is equal to or lower than the predetermined voltage threshold.

3. A fuel cell system comprising:

a bypass channel connected to an oxygen-containing gas supply flow path through which an oxygen-containing gas to be supplied to a fuel cell stack flows and an oxygen-containing gas discharge flow path through which the oxygen-containing gas discharged from the fuel cell stack flows;

a bypass valve disposed in the bypass channel;

a first battery having a first battery voltage;

a second battery having a second battery voltage higher than the first battery voltage;

a step-down device configured to step down a voltage from the second battery;

a switching unit configured to switch between the first battery and the step-down device to supply power to the bypass valve;

a compressor configured to supply the oxygen-containing gas to the fuel cell stack; and a control device including one or more processors that execute computer-executable instructions stored in a memory, wherein the one or more processors execute the computer-executable instructions to cause the control device to:

control the switching unit to supply electric power to the bypass valve from the step-down device and control an opening degree of the bypass valve, in a case where the voltage supplied from the first battery to the control device is equal to or lower than the predetermined voltage threshold, and start electric power supply to the compressor after completion of the control of the opening degree.

* * * * *